3,359,257
ASCORBO ADENYLATE COMPOUNDS
Carol Farhi, New York, N.Y., and Norman E. Harris, Waltham, Mass., assignors to Union Carbide Corporation, a corporation of New York
No Drawing. Filed Sept. 21, 1964, Ser. No. 398,030
6 Claims. (Cl. 260—211.5)

ABSTRACT OF THE DISCLOSURE

Ascorbo adenylates, such as the alkali metal ascorbo adenylates, procaine ascorbo adenylate or nicotinamide ascorbo adenylate are novel compositions which are useful for inhibiting the maturation cycle in pre- and post harvested produce.

Specification

This invention relates to a novel class of compositions useful as inhibitors in the maturation cycle of harvested produce. More particularly, this invention relates to nucleotide salts, generally known as ascorbo adenylates, and their ability to retard senescence in pre- and/or post-harvested produce.

Upon the harvesting of produce such as fruits, vegetables, and flowers, a maturation cycle commences which leads to a progressive deterioration of the quality and desirability of said produce manifested by changes in color, odor, taste, and overall appeaarance. These changes impair the marketability of the produce and seriously limit the allowable storage time between harvest and sale. The preservation systems heretofore commonly employed such as refrigeration, controlled atmospheres, hydrocooling, vacuum cooling and the like have proven effective but extremely expensive methods especially in a low profit margin area such as produce. Chemical preservatives, while effective, often cannot be safely employed due to their toxicity to mammals, their phytotoxicity, i.e., the damaging effect of such chemicals to the produce, and the inability of certain of these chemicals to be effectively applied to the produce.

Accordingly, it is an object of this invention to provide a novel class of compositions referred to generally herein as ascorbo adenylates which are effective inhibitors of the maturation cycle in pre- and post-harvested produce.

It is another object of this invention to provide maturation inhibitors for pre- and post-harvested produce which are non-toxic to mammals, exhibit no phytotoxicity, and are easily applied to and removed from said produce.

The present invention provides a novel class of nucleotide salts, the ascorbo adenylates, the cationic moiety of said salts being selected from the group consisting of the alkaline earth metals, iron, procaine, and nicotinamide. These nucleotide salts are effective inhibitors of the maturation cycle in pre- and post-harvested produce when applied thereto in a suitable inert carrier, preferably water. Exemplary of the alkaline earth metals which can form ascorbo adenylate are the members of Group 2a of the Periodic Table of Elements such as beryllium, magnesium, calcium, strontium, and barium. Most preferred within the alkaline earth metals are magnesium and calcium.

The compositions of the present invention are readily water-soluble making their application to and removal from produce inexpensive and extremely convenient. The nucleotide salts of the present invention in effective amounts in aqueous solution can be sprayed on produce shortly before harvesting, i.e., less than about a week before harvesting; or, said solution can be sprayed on post-harvested produce or can form a bath in which the post-harvested produce can be dipped. Concentrations of between about 10 to about 1000 parts per million (p.p.m.) of the ascorbo adenylates in aqueous solution have been found effective in the retardation of senescence in pre- and post-harvested produce, although other concentrations can be employed. At less than about 10 p.p.m. of the ascorbo adenylates, retardation is obtained but not for a commercially beneficial length of time. At concentrations greater than 1000 p.p.m of the ascorbo adenylates any incremental benefits obtained must be evaluated in view of the economics of the preservation process.

After treatment with the compositions of the present invention, the treated produce can be either packaged or shipped in bulk although pre-packaging is considered preferable as it provides an atmosphere which is high in humidity and carbon dioxide and low in oxygen. While not wishing to be bound by any proposed theory or mechanism, it is believed that the effective post harvest life of produce is extended due to the effect of ascorbo adenylates, in general, in delaying the breakdown of chlorophyll, inhibiting moisture loss, and in suppressing fungus and bacterial spoilage.

The following examples are illustrative of the present invention and are not to be construed in derogation of the spirit and scope thereof.

EXAMPLE I

*Preparation of procaine ascorbo adenylate*

Into a 250 milliliter, three neck, round bottom flask equipped with a mechanical stirrer were placed 75 ml. of distilled water and 7.08 grams (0.03 mole) of procaine. About 3.0 grams of procaine dissolved upon stirring. To the resultant slurry was added with constant agitation 5.208 grams (0.015 mole) of adenosine 2'-(3') monophosphate followed by 2.642 grams (0.015 mole) of ascorbic acid. The mixture, which at this point had a pH of about 5.0, was filtered by gravity through Whatman No. 2 filter paper to insure homogeneity. The filtrate, a clear, yellow solution, was concentrated to half of its volume by heating in vacuo. The concentrated filtrate, which had the consistency of a syrup, was transferred to a 250 ml. beaker and stored in a vacuum desiccator over anhydrous calcium sulfate. The syrup crystallized upon standing in the vacuum desiccator. The crystals of procaine ascorbo adenylate were ground to a powder with mortar and pestle. A sample of the powder in the form of a Nujol mull was subjected to infrared analysis. Procaine ascorbo adenylate was found to be a compound exhibiting bands at 6.10, 10.27, 11.80, 12.54, 12.99, and 14.31 microns which are not present in the spectra of procaine base, ascorbic acid, or adenylic acid.

EXAMPLE II

*Preparation of nicotinamide ascorbo adenylate*

1.221 grams (0.01 mole) of nicotinamide was dissolved in 50 cc. of distilled water. 1.736 grams (0.005 mole) of adenylic acid, i.e., adenosine-2'(3') monophosphate, was added to the aqueous nicotinamide solution. The solution was heated to dissolve completely the adenylic acid, resulting in a clear solution. 0.880 gram (0.005 mole) of ascorbic acid was added to the solution resulting in a clear pale yellow solution having a pH of about 3.8. The solution was filtered through Whatman No. 2 filter paper by gravity. The solution was concentrated by vacuum distillation to 15 cc. of a clear yellow solution. The resulting solution was evaporated to dryness in a vacuum desiccator and the resulting nicotinamide ascorbo adenylate was ground by mortar and pestle to a fine yellow powder. A sample of the nicotinamide ascorbo adenylate produced as described above was subjected to infrared analysis. It was determined to be a compound by its spectrum, which was found to exhibit bands at 12.00, 7.10, 8.72, and 9.52 microns which are not present in the spectra of nicotinamide, ascorbic acid, or adenylic acid, respectively.

EXAMPLE III

*Preparation of calcium ascorbo adenylate*

6.94 grams (0.02 mole) of adenylic acid were slurried in 150 cc. of distilled water. 2.002 grams (0.02 mole) of calcium carbonate were added to the adenylic acid slurry. Carbon dioxide was evolved. 3.52 grams (0.02 mole) of ascorbic acid was added to the calcium adenylate slurry. The slurry was warmed to about 40°–50° C. until a homogeneous solution formed. The solution was filtered by gravity through Whatman No. 2 filter paper. The pH of the water-white solution was about 4.7. The solution was then concentrated to about 30 to 40 cc. by vacuum distillation and placed in a desiccator to dry. The white powder which resulted was subjected to infrared analysis. The spectrum of calcium ascorbo adenylate was found to exhibit a band at 12.58 microns not found in the spectrum of adenylic acid, ascorbic acid, or calcium carbonate. Its spectrum also was missing the sharp band at 7.85 microns found in the ascorbic acid spectrum.

EXAMPLE IV

*Preparation of magnesium ascorbo adenylate*

1.761 grams (0.01 mole) of ascorbic acid was dissolved in 75 cc. of water. 0.403 gram (0.01 mole) of magnesium oxide was added to the ascorbic acid solution. A portion of the magnesium oxide went into solution. 3.472 grams (0.01 mole) of adenylic acid, i.e., adenosine-2′(3′) monophosphate, was added to the mixture of magnesium oxide and ascorbic acid. The resulting mixture was warmed to about 40° C. to complete solution. The pH of the resulting solution was 4.4. The solution was filtered by gravity through Whatman No. 2 filter paper and then concentrated to about 10 cc., using vacuum distillation, and placed in a desiccator to dry. The resulting powder of magnesium ascorbo adenylate was subjected to infrared analysis. The spectrum of magnesium ascorbo adenylate exhibited bands at 6.06, 8.25, 9.52, and 12.56 microns which are absent in the spectra of magnesium oxide, ascorbic acid, or adenylic acid.

EXAMPLE V

*Preparation of iron ascorbo adenylate*

8.34 grams (0.03 mole) of ferrous sulfate $$(FeSO_4 \cdot 7H_2O)$$

was dissolved in 18 cc. of water. 3.18 grams (0.03 mole) of sodium carbonate was dissolved in 15 cc. of water. The clear solutions of ferrous sulfate and sodium carbonate were admixed to form a heavy precipitate of ferrous carbonate. The precipitate was isolated by filtration and was washed three times with water. The moist ferrous carbonate was added to a solution of 5.28 grams (0.03 mole) of ascorbic acid dissolved in 100 cc. of water. Carbon dioxide was evolved. The resulting solution was purple. 10.41 grams (0.03 mole) of adenylic acid was dissolved in 150 cc. of water and added to the mixture of ferrous carbonate and ascorbic acid with additional evolution of carbon dioxide. The resulting slurry had a pH of 4.1. Nitrogen gas was bubbled through the slurry of ferrous ascorbo adenylate for 15 minutes. The slurry was filtered to recover a bright purple precipitate which was placed in a vacuum desiccator to dry. The resulting purple powder of ferrous ascorbo adenylate was subjected to infrared analysis. The spectrum of ferrous ascorbo adenylate exhibited absorption bands at 6.61 microns and 8.24 microns, neither of which was present in the spectra of $FeSO_4 \cdot 7H_2O$, ascorbic acid, or adenylic acid.

The following examples illustrate the inhibition of the maturation cycle of produce through the application thereto of ascorbo adenylates. It was found that after storage periods in excess of two weeks, fruits and vegetables treated with ascorbo adenylate solutions retained their freshness, exhibited good color and texture, had fewer deteriorated outer leaves, and possessed better flavor than the untreated control samples.

EXAMPLE VI

*Treatment of head lettuce*

Powdered procaine ascorbo adenylate prepared as described in Example I was dissolved in sufficient distilled water to provide an aqueous solution containing 100 parts by weight of procaine ascorbo adenylate per million of water. This solution constituted the stock solution which was used for the treatment of produce in this and the following examples. In the same manner, aqueous solutions of the other ascorbo adenylates hereinabove described can be effectively applied to produce to inhibit maturation.

The stock solution of procaine ascorbo adenylate (PAA) was applied to head lettuce test specimens either by dipping the lettuce into the stock solution for 30 seconds or by spraying each head with 5 to 10 ml. of stock solution so that the outer leaves were completely wetted. The treated test specimens were stored for 12 days at 40° F. and then packaged in vented 0.75 or 0.5 mil polyethylene bags for 4 days under ambient conditions of room temperature. Control specimens were subjected to the same storage conditions but did not receive any treatment with procaine ascorbo adenylate. The qualitative results delineated in the table below demonstrate the superiority of the treated over the untreated specimens in three categories, viz., the amount of trim, i.e., the number of leaves which had deteriorated necessitating their removal, the bulk discoloration, and sensory properties, i.e., color, flavor and texture. It can be readily seen from these data that the procaine ascorbo adenylate treatment affords a more marketable product since the average purchaser uses such empirical criteria for choosing or rejecting produce at the local market.

TABLE

| Sample No. | Treatment | Amount of Trim | Bulk Discoloration | Sensory Factors |
| --- | --- | --- | --- | --- |
| 1 | 100 p.p.m. PAA | 2 outer leaves | Slight | Little or no loss of color, flavor and texture. |
| 2 | 100 p.p.m. PAA | do | do | Do. |
| 3 | Control (no PAA) | 6 leaves | Moderate | Some loss of color, flavor and texture. |
| 4 | do | 6–8 leaves | do | Do. |

EXAMPLE VII

*Treatment of Gros Michel bananas*

Gros Michel bananas (No. 1 stage of maturity-green) were completely wetted by an aqueous spray containing 100 p.p.m. of procaine ascorbo adenylate and wrapped in 3 mils polyethylene film (low density) and stored at 75° F., 53% relative humidity for 16 days. The maturation of the bananas was delayed for several days and there were no signs of phytotoxicity (plant injury) or any other deleterious flavor, texture, or odor changes.

EXAMPLE VIII

*Treatment of Pascal celery*

Pascal celery was sprayed with an aqueous solution of procaine ascorbo adenylate (100 p.p.m) and the control celery with distilled water. This produce was then bagged in 0.75 mil polyethylene film bags and stored at 40° F. and 88% relative humidity for 8 days. At the end of this time interval the procaine ascorbo adenylate treated celery had better flavor and was more firm than the untreated control.

What is claimed is:
1. Ascorbo adenylates wherein the cationic moiety thereof is selected from the group consisting of the alkaline earth metals, iron, procaine, and nicotinamide.
2. Calcium ascorbo adenylate.
3. Magnesium ascorbo adenylate.
4. Ferrous ascorbo adenylate.
5. Procaine ascorbo adenylate.
6. Nicotinamide ascorbo adenylate.

References Cited

UNITED STATES PATENTS 3,089,869  5/1963  Mauvernay _____ 260—211.5

LEWIS GOTTS, *Primary Examiner.*

J. R. BROWN, *Assistant Examiner.*